US009094864B2

(12) United States Patent
Payyappilly et al.

(10) Patent No.: US 9,094,864 B2
(45) Date of Patent: Jul. 28, 2015

(54) ARCHITECTURE FOR WLAN OFFLOAD IN A WIRELESS DEVICE

(75) Inventors: Ajith Tom Payyappilly, San Diego, CA (US); Venkata Satish Kumar Vangala, San Diego, CA (US); Shanta Pavan Namburi, Santa Clara, CA (US); Suli Zhao, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 99 days.

(21) Appl. No.: 13/408,964

(22) Filed: Feb. 29, 2012

(65) Prior Publication Data
US 2012/0224485 A1 Sep. 6, 2012

Related U.S. Application Data

(60) Provisional application No. 61/448,525, filed on Mar. 2, 2011.

(51) Int. Cl.
*H04W 28/08* (2009.01)
*H04L 12/46* (2006.01)
(Continued)

(52) U.S. Cl.
CPC ........... *H04W 28/08* (2013.01); *H04L 12/4633* (2013.01); *H04W 88/06* (2013.01); *H04W 92/02* (2013.01)

(58) Field of Classification Search
CPC ..... H04W 84/12; H04W 84/02; H04W 88/10; H04W 76/041; H04W 76/022; H04W 80/06; H04W 80/04
USPC ....................................................... 370/235
See application file for complete search history.

(56) References Cited

U.S. PATENT DOCUMENTS 7,631,107 B2 * 12/2009 Pandya ......................... 709/250
2005/0025182 A1 * 2/2005 Nazari ........................... 370/469
(Continued)

FOREIGN PATENT DOCUMENTS

EP 1705866 A1 9/2006
JP 2005528062 A 9/2005
(Continued)

OTHER PUBLICATIONS

Qualcomm Incorporated (Mar. 2010). "3G/WiFi Seamless Offload." pp. 1-9.
(Continued)

*Primary Examiner* — Omar Ghowrwal
*Assistant Examiner* — Ellen A Kirillova
(74) *Attorney, Agent, or Firm* — Abdollah Katbab

(57) ABSTRACT

Architecture for performing WLAN offload in a wireless device is disclosed. In an exemplary embodiment, an apparatus includes an application section configured to form IP packets from data to be transmitted, a modem section configured to apply a cellular protocol to the IP packets to form cellular protocol packets, an endpoint configured to encapsulate the cellular protocol packets to form outer IP tunnel packets, and a WLAN interface configured to transmit the outer IP tunnel packets over a WLAN communication channel. In another exemplary embodiment, an apparatus includes a WLAN interface configured to receive outer IP tunnel packets over a WLAN communication channel, an endpoint configured to extract cellular protocol packets from the outer IP tunnel packets, a modem processor configured to remove a cellular protocol from the cellular protocol packets to form IP packets, and an application processor configured to extract received data from the IP packets.

38 Claims, 11 Drawing Sheets

(51) Int. Cl.
*H04W 88/06* (2009.01)
*H04W 92/02* (2009.01)

(56) References Cited

U.S. PATENT DOCUMENTS

| | | |
|---|---|---|
| 2006/0046728 A1 | 3/2006 | Jung et al. |
| 2006/0059199 A1* | 3/2006 | Lappalainen et al. ..... 707/104.1 |
| 2006/0245408 A1 | 11/2006 | Lee et al. |
| 2007/0073854 A1 | 3/2007 | Lindquist |
| 2009/0052500 A1* | 2/2009 | Bush et al. .................... 375/145 |
| 2010/0014459 A1 | 1/2010 | Mir et al. |
| 2010/0046474 A1* | 2/2010 | Kozakai et al. ............... 370/331 |
| 2010/0195621 A1* | 8/2010 | Kekki et al. .................... 370/332 |
| 2011/0075675 A1 | 3/2011 | Koodli et al. |
| 2011/0103310 A1 | 5/2011 | Stojanovski et al. |
| 2011/0222523 A1 | 9/2011 | Fu et al. |

FOREIGN PATENT DOCUMENTS

| | | |
|---|---|---|
| JP | 2009509372 A | 3/2009 |
| WO | 2005008964 A1 | 1/2005 |
| WO | 2007078663 A2 | 7/2007 |

OTHER PUBLICATIONS

International Search Report and Written Opinion—PCT/US2012/027583—ISA/EPO—May 25, 2012.

* cited by examiner

| IP header | TCP/UDP header | Application data |
|---|---|---|
| Source IP address = IP address assigned by PDSN to MS through PPP<br>Destination IP address = IP address of application server | | |

TCP or UDP packet from application on MS to the application server

FIG. 7

| IP header | TCP/UDP header | Application data |
|---|---|---|
| Source IP address = IP address assigned by WLAN-AP to MS<br>Destination IP address = IP address of SIP server | | |

SIP packet sent from IMS stack on MS to SIP server

FIG. 8

| PPP header | IP header | TCP/UDP header | Application data |
|---|---|---|---|
| | Source IP address = IP address assigned by PDSN to MS through PPP<br>Destination IP address = IP address of application server | | |

Packet to be sent from MS after PPP encapsulation

FIG. 9

| CDMA MAC header | RLP header | PPP header | IP header | TCP/UDP header | Application data |
|---|---|---|---|---|---|
| | | | Source IP address = IP address assigned by PDSN to MS through PPP<br>Destination IP address = IP address of application server | | |

Packet to be sent from MS over CDMA air-interface

FIG. 10

| CT-FMC header | PPP header | IP header<br>Source IP address = IP address assigned by PDSN to MS through PPP<br>Destination IP address = IP address of application server | TCP/UDP header | Application data |

Packets to be sent from MS with FMC header

FIG. 11

| IP header<br>Source IP address = IP address assigned by WLAN AP to MS<br>Destination IP address = IP address of wPDIF-WAG | UDP header | CT-FMC header | PPP header | IP header<br>Source IP address = IP address assigned by PDSN to MS through PPP<br>Destination IP address = IP address of application server | TCP/UDP header | Application data |

FMC packets sent from MS going over WLAN tunnel

FIG. 12

| CDMA MAC header | RLP header | PPP header | IP header<br>Destination IP address = IP address assigned by PDSN to MS through PPP<br>Source IP address = IP address of application server | TCP/UDP header | Application data |

Packets received by MS over CDMA air-interface

FIG. 13

| PPP header | IP header<br>Destination IP address = IP address assigned by PDSN to MS through PPP<br>Source IP address = IP address of application server | TCP/UDP header | Application data |

PPP packet received by MS

FIG. 14

| IP header<br>Destination IP address = IP address assigned by<br>PDSN to MS through PPP<br>Source IP address = IP address of application server | TCP/UDP<br>header | Application data |
|---|---|---|

TCP or UDP packet from application server to application on MS

FIG. 15

| IP header<br>Destination IP address = IP address assigned by<br>WLAN-AP to MS<br>Source IP address = IP address of SIP server | TCP/UDP<br>header | SIP data |
|---|---|---|

SIP packet sent from SIP server to IMS stack on MS

FIG. 16

| IP header<br>Destination IP address = IP address<br>assigned by WLAN-AP to MS<br>Source IP address = IP address of<br>wPDIF-WAG | UDP<br>header | CT-<br>FMC<br>header | PPP<br>header | IP header<br>Destination IP address = IP address<br>assigned by PDSN to MS through PPP<br>Source IP address = IP address of<br>application server | TCP/<br>UDP<br>header | Application data |
|---|---|---|---|---|---|---|

FMC packets received by MS over WLAN tunnel

FIG. 17

| CT-FMC<br>header | PPP<br>header | IP header<br>Destination IP address = IP address assigned by<br>PDSN to MS through PPP<br>Source IP address = IP address of application server | TCP/UDP<br>header | Application data |
|---|---|---|---|---|

Packets received by MS with FMC header

FIG. 18

ARCHITECTURE FOR WLAN OFFLOAD IN A WIRELESS DEVICE

CLAIM TO PRIORITY

This patent application claims the benefit of priority from U.S. Provisional Patent Application No. 61/448,525, entitled "SYSTEM AND METHOD FOR WLAN OFFLOAD IN A DUAL PROCESSOR SMART PHONE" filed on Mar. 2, 2011 and assigned to the assignee hereof and hereby expressly incorporated by reference herein.

BACKGROUND

1. Field

The present application relates generally to the design and operation of wireless devices, and more particularly, to a wireless device providing WLAN offload.

2. Background

Wireless devices are becoming increasingly more sophisticated and offer many advantages over previous generations. Devices know as "smart phones" are now available that provide not only communication functions, but can also download and execute applications to provide additional features and functionality. It is now common to find smart phones that include a dual processor chipset, where a modem processor provides support for cellular communications and an applications processor provides a user interface, executes applications, and supports wireless local area network (WLAN) communications.

As more wireless devices are placed into operation, network overloading is becoming an increasing concern for cellular network operators. For example, many operators provide custom services so that wireless devices utilizing those services typically need to connect back to the operator's home network. Thus, the types of services offered by network providers also have contributed to the increase in network loading.

One technique used to address cellular network overloading is referred to as "Fixed mobile convergence" or "WLAN offload." For example, when a wireless device is in a WLAN coverage area, data that would normally be transmitted over the cellular network is offloaded to the WLAN network, thereby decreasing the loading on the cellular network. When the wireless device moves out of the WLAN coverage area, data services to the core cellular network use the cellular network as the air-interface.

Some network operators currently provide WLAN offload solutions. For example, in one implementation, an application executing on the device is configured to determine which air-interface is available for the application to use to communicate with the cellular home network. The application then has to specify to the Operating System which technology to use and the Operating system has to format the packets with the appropriate protocol and forward the packets for transmission using the determined air-interface. Such operation by an application is inefficient and may require modifications or updates to the operating system and/or applications that execute on the device.

Unfortunately, there are several additional issues that are not satisfactorily addressed by existing techniques for providing efficient WLAN offload. For example, WLAN offload should operate independently from the processor configurations provided by different handset venders. WLAN offload should also operate independently from the operating system (OS) running on the wireless device and independently of the cellular technology used by the cellular network. Furthermore, end-user applications should not even be aware of whether the underlying air-interface used for transporting packets to and from the core network is the cellular air-interface or the WLAN air-interface.

Therefore, it would be desirable to have a device architecture that facilitates efficient WLAN offload and which overcomes the problems addressed above.

SUMMARY

In various exemplary embodiments, a novel architecture is provided for WLAN offload in a wireless device.

In an aspect, apparatus is provided for performing WLAN offload. The apparatus comprises an application section configured to form IP packets from data to be transmitted, a modem section configured to apply a cellular protocol to the IP packets to form cellular protocol packets, an endpoint configured to encapsulate the cellular protocol packets to form outer IP tunnel packets, and a WLAN interface configured to transmit the outer IP tunnel packets over a WLAN communication channel.

In an aspect, a method is provided for performing WLAN offload. The method comprises forming IP packets from data to be transmitted, applying a cellular protocol to the IP packets to form cellular protocol packets, encapsulating the cellular protocol packets to form outer IP tunnel packets, and transmitting the outer IP tunnel packets over a WLAN communication channel.

In an aspect, apparatus is provided for performing WLAN offload. The apparatus comprises means for forming IP packets from data to be transmitted, means for applying a cellular protocol to the IP packets to form cellular protocol packets, means for encapsulating the cellular protocol packets to form outer IP tunnel packets, and means for transmitting the outer IP tunnel packets over a WLAN communication channel.

In an aspect, a computer program product is provided for performing WLAN offload. The computer program product comprises a non-transitory computer readable medium embodying codes executable by a processor to form IP packets from data to be transmitted, apply a cellular protocol to the IP packets to form cellular protocol packets, encapsulate the cellular protocol packets to form outer IP tunnel packets, and transmit the outer IP tunnel packets over a WLAN communication channel.

In an aspect, apparatus is provided for performing WLAN offload. The apparatus comprises a WLAN interface configured to receive outer IP tunnel packets over a WLAN communication channel, an endpoint configured to extract cellular protocol packets from the outer IP tunnel packets, a modem processor configured to remove a cellular protocol from the cellular protocol packets to form IP packets, and an application processor configured to extract received data from the IP packets.

In still another aspect, a method is provided for performing WLAN offload. The method comprises receiving outer IP tunnel packets over a WLAN communication channel, extracting cellular protocol packets from the outer IP tunnel packets, removing a cellular protocol from the cellular protocol packets to form IP packets, and extracting received data from the IP packets.

BRIEF DESCRIPTION OF THE DRAWINGS

The foregoing aspects described herein will become more readily apparent by reference to the following description when taken in conjunction with the accompanying drawings wherein:

FIGS. 7-18 show exemplary embodiments of message formats for use with the WLAN offload architecture;

DETAILED DESCRIPTION

The detailed description set forth below in connection with the appended drawings is intended as a description of exemplary embodiments of the invention and is not intended to represent the only embodiments in which the invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

Figure 1:
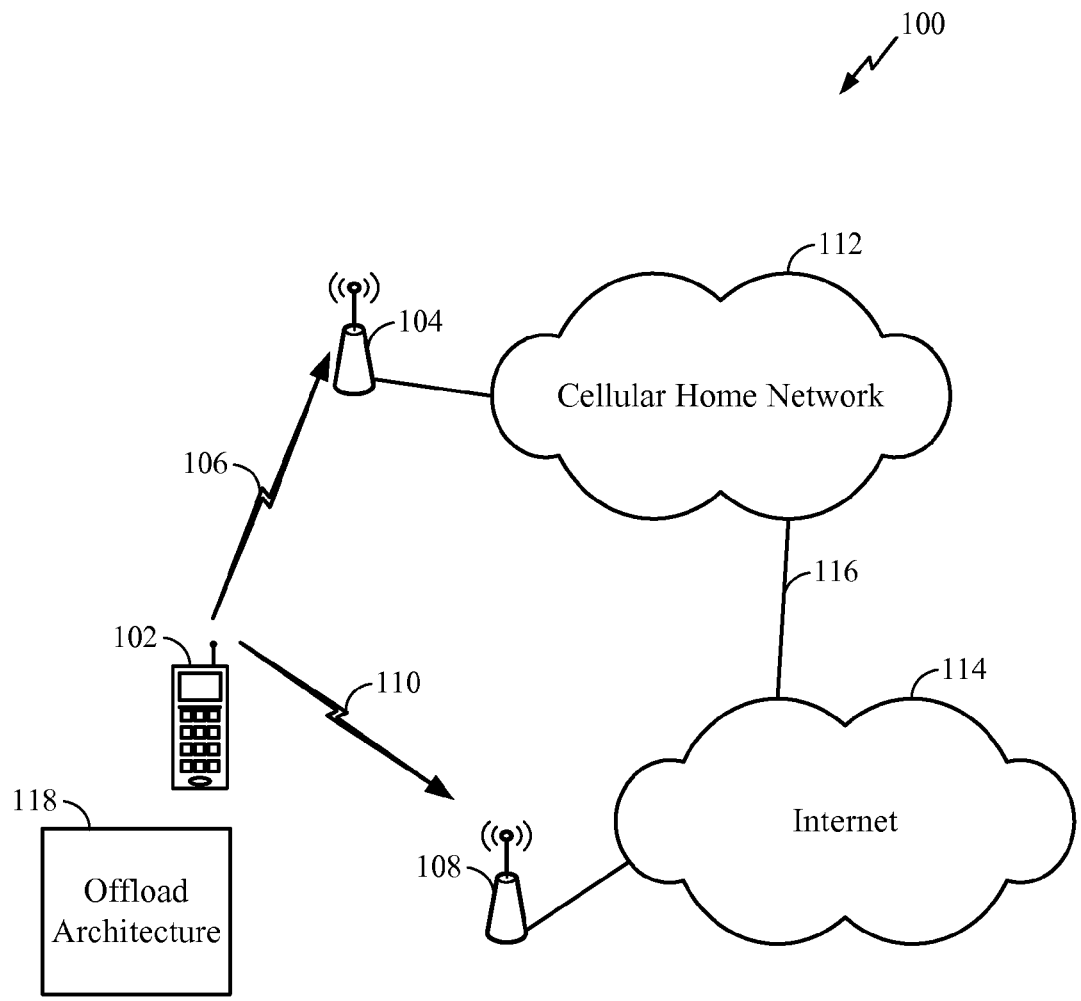
FIG. 1 shows an exemplary communication network that comprises a device having an exemplary embodiment of a novel WLAN offload architecture.

FIG. 1 shows an exemplary communication network 100 that comprises a device 102 having an exemplary embodiment of a novel WLAN offload architecture 118. The device 102 is configured to communicate with a cellular base station 104 using a cellular channel 106. The device 102 is also configured to communicate with a WLAN hotspot 108 using WLAN channel 110. The cellular base station 104 is connected to a cellular network 112, which provides communication and data services to the device 102. The hotspot 108 is connected to the Internet 114, which can provide a variety of services to the device 102. Link 116 allows communication between the cellular network 112 and the Internet 114.

The device 102 comprises the novel WLAN offload architecture 118 that is configured to offload cellular data communications from the cellular channel 106 to the WLAN communication channel 110. For example, during times when the device 102 is in the coverage area of the hotspot 108, the WLAN offload architecture 118 operates on the device 102 to route traffic to the cellular home network 112 through the hotspot 108 and the Internet 114. The result is that traffic congestion on the cellular network is reduced.

In various exemplary embodiments, the WLAN offload architecture 118 is configured to provide WLAN offload independent from the processor configuration provided by the wireless device 102. The WLAN offload architecture 118 operates independent of the OS running on the wireless device 102 and independent of the cellular technology used to provide the cellular communication channel 106. Furthermore, applications running on the device 102 are not aware of whether the underlying air-interface used for transporting packets to and from the core network 112 is the cellular air-interface channel 106 or the WLAN air-interface channel 110. The design and operation of the WLAN offload architecture is described in more detail below.

Thus, a novel WLAN offload architecture is provided that is operable to provide packet data services between a device and a cellular network using WLAN offload. For example, the novel architecture 118 operates to offload packet data traffic based on WLAN availability to relieve congestion on the cellular air-interface. The architecture can be modified and/or extended to provide WLAN offload regardless of the cellular technology or carrier. It is also applicable to any operating system or applications running on the device 102.

Figure 2:
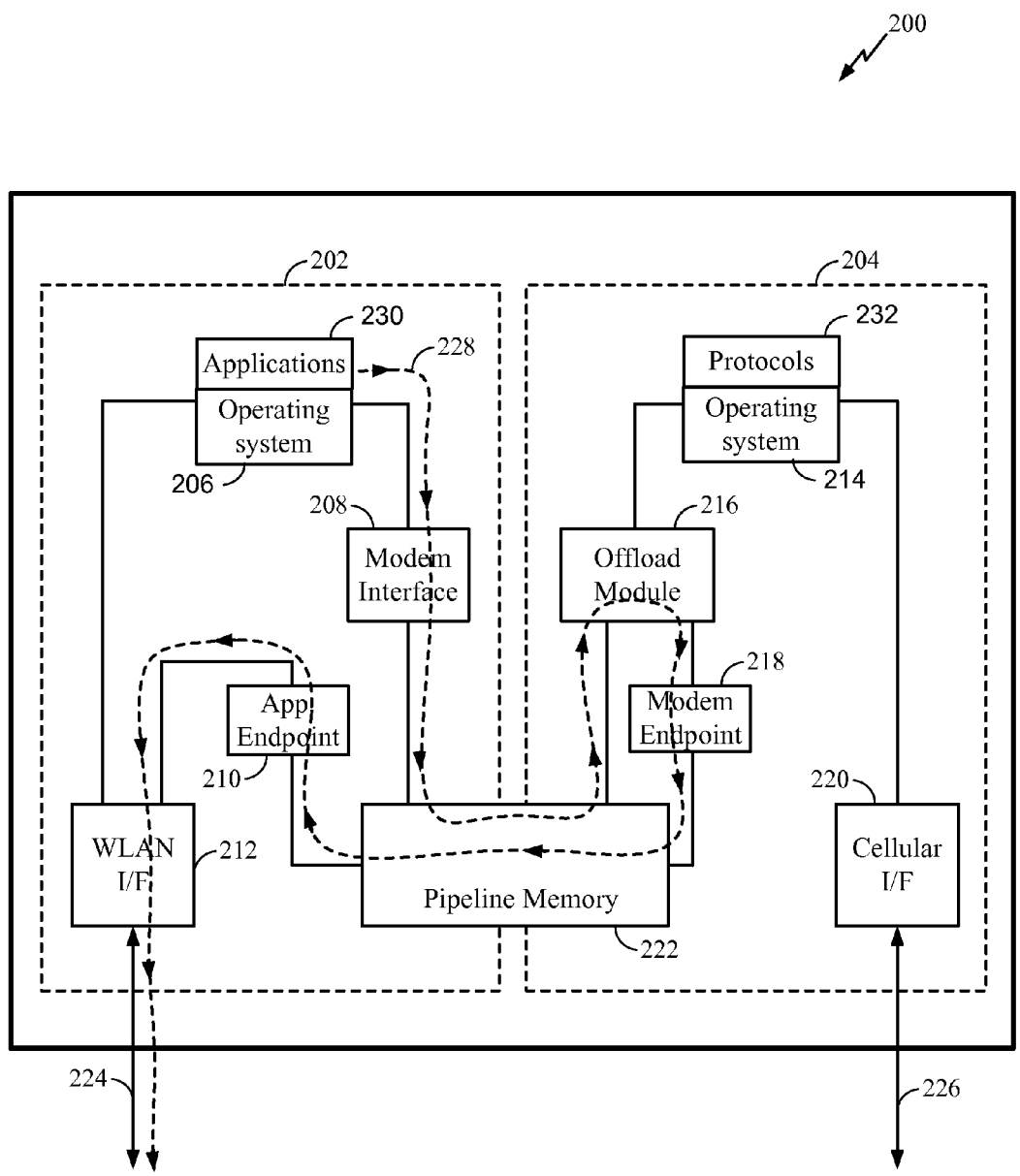
FIG. 2 shows a device that comprises an exemplary embodiment of the WLAN offload architecture.

FIG. 2 shows a device 200 that comprises an exemplary embodiment of a novel WLAN offload architecture. For example, the device 200 is suitable for use as the device 102 shown in FIG. 1. The device 200 comprises an application section 202 and a modem section 204. The application section 202 comprises an operating system module 206 that operates to execute applications 230 on the device 200. For example, the operating system module 206 runs an OS such as WindowsMobile, Android, LIMO, MeeGo, or other suitable OS. The operating system module 206 is connected to communicate with a WLAN interface 212 that provides WLAN communication with a WLAN hotspot using WLAN channel 224. The operating system module 206 is also connected to communicate with a modem interface 208. The modem interface 208 communicates with the modem section 204 using pipeline memory 222 to send and receive packets using a cellular channel 226 provided by the modem section 204.

The modem section 204 comprises an operating system module 214 that operates to apply communication protocols 232 to packets for transmission. For example, the protocols support various wireless technologies such as all 3gpp technologies LTE/UMTS/GSM or all 3gpp2 technologies EHRPD/EVDO/1x/IS95. In another embodiment, the protocols support all the technologies LTE/UMTS/GSM/EHRPD/EVDO/1x/IS95 to provide multimode operation. The operation system module 214 is connected to communicate with a cellular interface 220. The cellular interface 220 provides cellular communication with a cellular base station using the cellular channel 226 and a communication protocol.

An offload module 216 is connected between the memory 222 and the operating system module 214. The offload module 216 receives data from the applications section 202 that is to be transmitted over the cellular network using the cellular interface 220. The offload module 216 is also connected to a modem endpoint 218. The modem endpoint 218 communicates with an applications endpoint 210 using the memory 222. The offload module 216 operates to route data to the operating system module 214 or the modem endpoint 218.

During operation, the device 102 operates to provide WLAN offload to reduce congestion on a cellular network. For example, an application 230 communicates with the operating system 206 to output data for transmission on the cellular network. For example, data packets originating from the application 230 are processed by the operating system 206 and travel down an IP stack to form IP packets. The IP packets follow path 228. The data is received by the modem interface 208 which forwards the data to modem section 204 using the memory 222.

The offload module 216 receives the data from the memory 222 and makes a decision as to whether the data is to be transmitted on the cellular network or an available WLAN network. For example, the offload module 216 is aware of the current network connections available to the device and makes the decision based on the available connections.

In an exemplary embodiment, the offload module 216 determines that the data is to be transmitted on the cellular network and forwards the data to the operating system 214. The operating system 214 applies the appropriate protocols and forwards the packets to the cellular interface 220 for transmission over the cellular channel 226.

In another exemplary embodiment, the offload module 216 determines that the data is to be transmitted over an available WLAN channel 224. The offload module then processes the IP packets to apply appropriate cellular carrier proprietary layers and/or cellular 3gpp/3gpp2 protocols. For example, the offload module 216 may communicate with the operating system 214 to apply the appropriate protocols to the packets. Thus, the packets now have carrier proprietary and/or 3gpp/3gpp2 layer headers on them. The offload module 216 passes the data to the modem endpoint 218 where the data is then forwarded through the memory 222 to the application endpoint 210.

The application endpoint 210 applies additional IP protocols and passed the data to the WLAN interface 212, which transmits the data over the available WLAN channel 224 to the Internet. For example, the application endpoint 210 encapsulates the packets in outer tunnel IP packets and sends these outer IP tunnel packets to the WLAN interface 212 to be sent out over the WLAN channel 224 to the Internet. Once received at the Internet, the data is forwarded by a selected gateway to the cellular home network based on the applied protocols.

It should be noted that the modules and functional blocks of the device 200 can be implemented in hardware and/or by hardware executing software. Accordingly, in various exemplary implementations, each of the application section 202 and the modem section 204 can be implemented by one or more processors executing the appropriate software. For example, in an exemplary embodiment, the operating system modules 206 and 214 comprise at least one of a processor, CPU, gate-array, discrete hardware, logic, memory, and/or any other suitable hardware, all of which are configured to perform the functions describe herein by operating in a standalone mode and/or by executing one or more sets of instructions or codes stored or embodied in a memory.

Thus, the WLAN offload architecture of the device 200 operates to off load a cellular network by transmitting data over an available WLAN channel. The process is reversed for data received over the WLAN channel from the cellular home network. For example, data received over the WLAN channel 224 is encapsulated in the appropriate IP and cellular protocols. The data flows from the WLAN interface 212 along path 228 in the reverse direction where IP protocol headers are removed at the application endpoint 210 and cellular protocol headers are removed at the modem endpoint 218 and offload module 216. The received data then flows back through the memory 222 to the modem interface 208 and finally to the operating system 206 that passes the data to the appropriate application 230. A more detailed description of the operation of the novel WLAN offload architecture is provided below.

Figure 3:
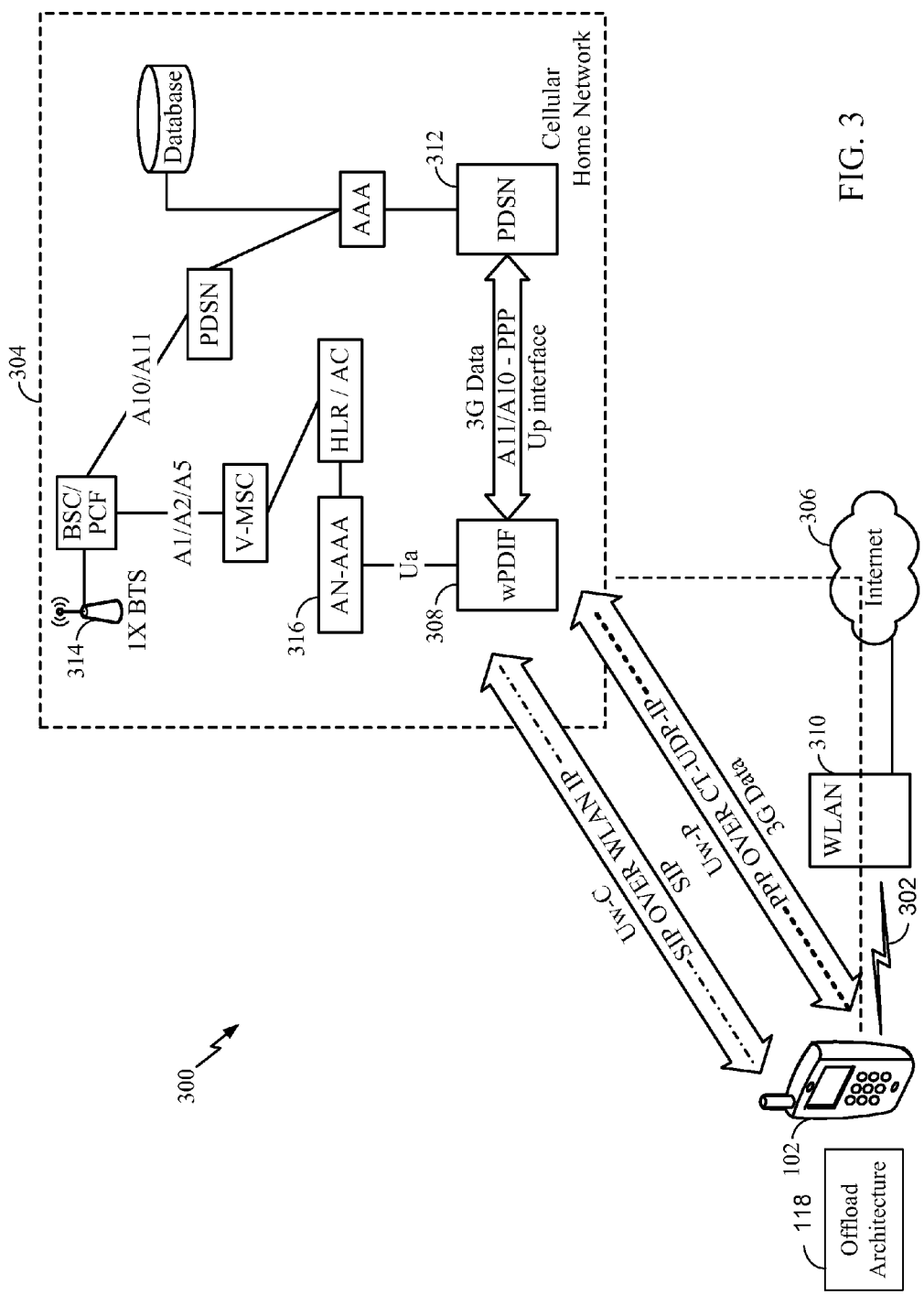
FIG. 3 shows an exemplary embodiment of a network configuration comprising a device and the novel WLAN offload architecture that operates to provide WLAN offload.

FIG. 3 shows an exemplary embodiment of a network configuration 300 comprising the device 102 and the novel WLAN offload architecture 118 that operates to provide WLAN offload. During intervals when a WLAN channel 302 is available to device 102 via a WLAN hotspot 310, the offload architecture 118 provides communication with a cellular home network 304 using the WLAN channel 302 and WLAN hotspot 310 to reduce overloading on cellular channels.

During WLAN offload, the offload architecture 118 operates at the device 102 to establish communication with wPDIF 308 of the cellular home network 304. The wPDIF 308 communicates with a PDSN 310. Also shown are cellular base station 314 and AN-AAA 316. During packet routing on a reverse link, an IP header is used to get the packet to the gateway 308. The gateway 308 then sees a cell header and routes the packet to the cellular home network 304 accordingly. In an exemplary embodiment, the application endpoint 210 functions to address packets to the gateway 308.

System Features and Functionality

The novel WLAN offload architecture can be extended to a variety of WLAN offload mechanisms. Listed below are some of the key features and functionality provided by embodiments of the WLAN offload architecture.

Figure 4:
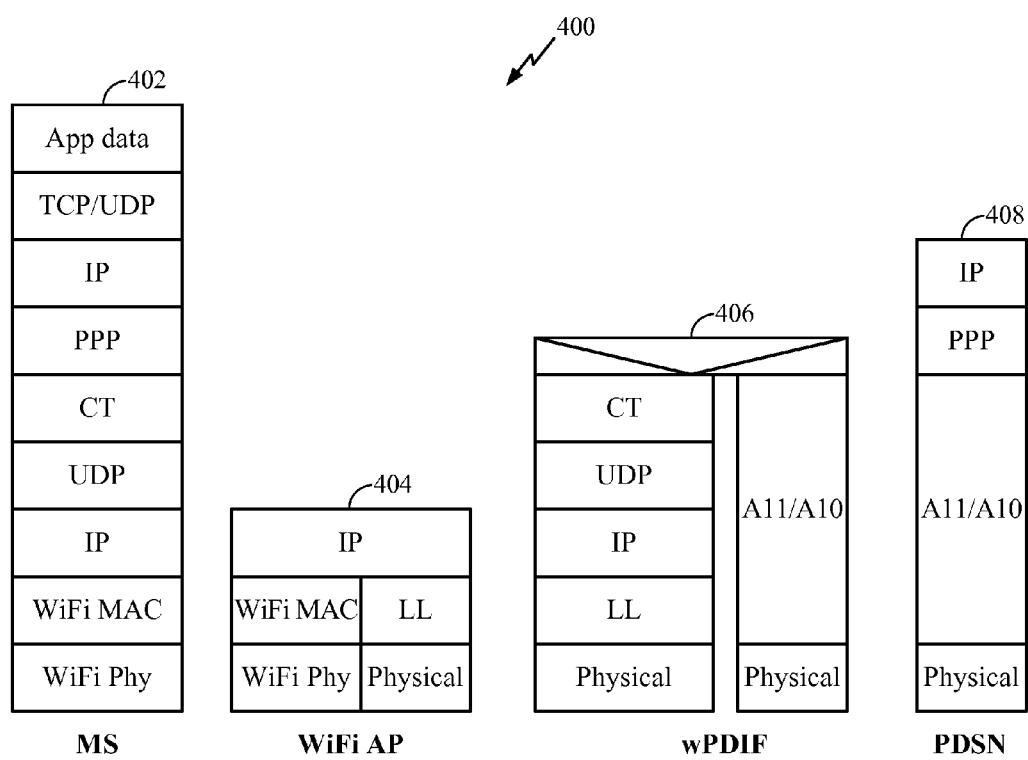
FIG. 4 shows exemplary embodiment of protocol stacks for use with the WLAN offload architecture.

1. Support for IP over WLAN domain
2. WLAN Access Gateway (wPDIF-WAG) discovery mechanisms
3. Proprietary tunnel establishment procedures
4. Authentication procedure:
   CAVE authentication between UE and AN-AAA
   MD5-CHAP authentication between UE and AN-AAA
   PAP/CHAP authentication between PDSN and UE
5. Network Address Translation (NAT) Keep-alive (KA) procedures
6. Support for proprietary cdma2000 packet-switched (services supported via PDSN)
7. Support for packet encapsulation for operation of packet-switched services
8. Proprietary tunnel release procedures
9. Configuration using DHCP
10. Inter-AP Handoff (HO)
11. Dual standby on WiFi and 1x systems
12. SSD Update procedure FIG. 4 shows exemplary embodiment of protocol stacks 400 for use with the novel WLAN offload architecture. For example, the protocol stacks 400 are associated with entities shown in the network configuration of FIG. 3.

The protocol stacks 400 comprise stack 402 associated with device 102, stack 404 associated with access point 308, stack 406 associated with wPDIF 310 and stack 408 associated with PDSN 310. The data being offloaded from the cellular network to the WLAN network have to traverse the illustrated protocol stacks at the device and at the key nodes on the network along its path.

Figure 5:
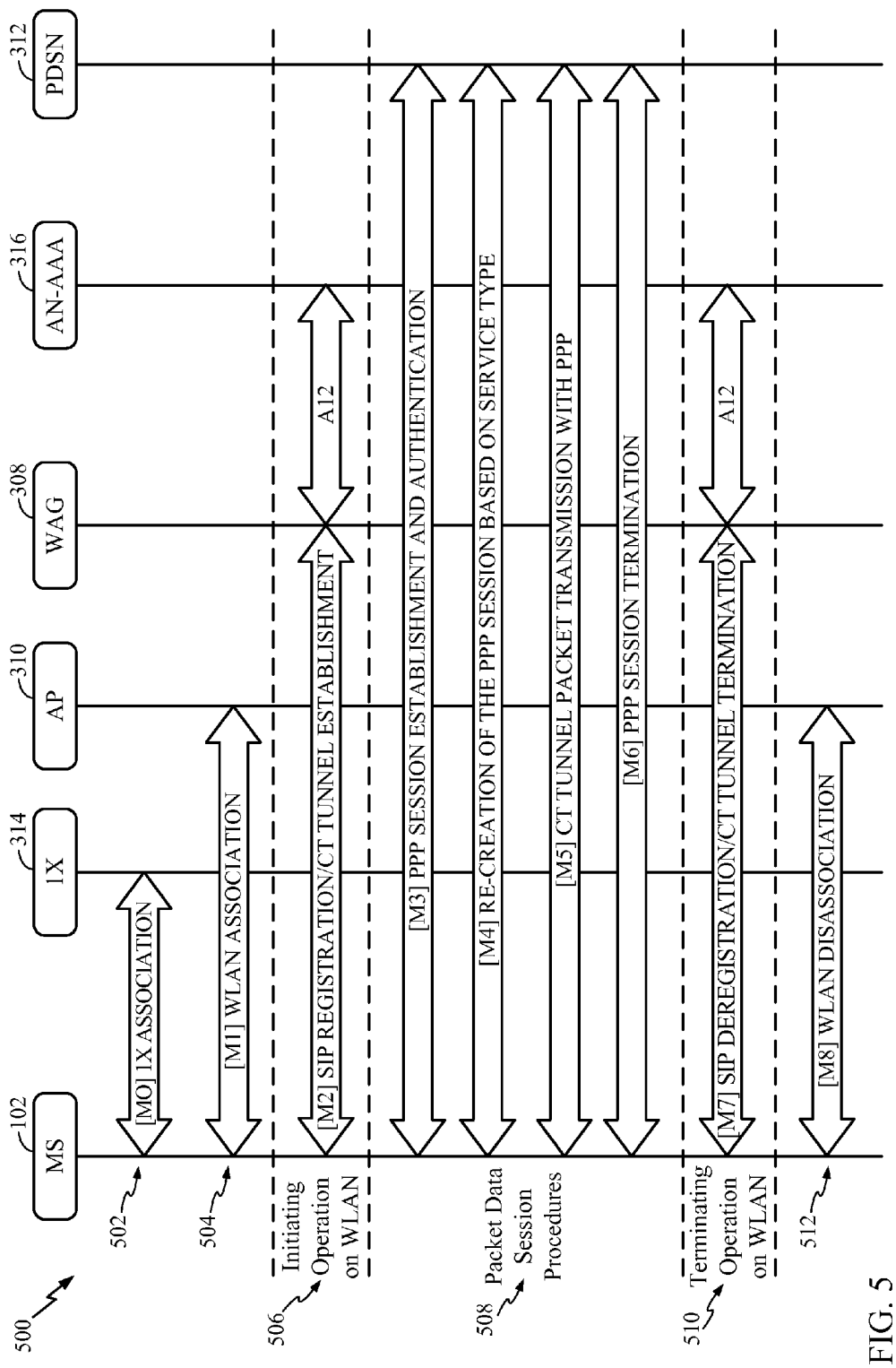
FIG. 5 shows an exemplary embodiment of a call flow for use with the WLAN offload architecture.

FIG. 5 shows an exemplary embodiment of a call flow 500 for use with the novel WLAN offload architecture. For example, the call flow 500 is described with reference to the network 300 and protocol stacks 400. For example, the call flow 500 illustrates the interactions between the device 102, base station 314, access point 308, wPDIF 308, AN-AAA 316, and PDSN 312. One or more of the operations of the call flow 500 can be performed, for example, by the device 200 shown in FIG. 2.

At 502, a 1x association is formed between the device 102 and the base station 314. For example, the modem section 204 operates to establish the 1x association with the base station 314 using the cellular interface 220.

At 504, an association is formed between the device 102 and the WLAN access point 310. For example, the application section 202 operates to establish the association with the access point 310 using the WLAN interface 212.

At 506, WLAN operation is initiated. A SIP registration is performed and a CT tunnel is established. For example, the application section 202 operates to perform this function using the WLAN interface 212.

At 508, packet data session procedures are performed to first establish and then terminate a PPP session. For example, the application section 202 operates to perform this function using the WLAN interface 212.

At 510, WLAN operation is terminated. For example, A SIP de-registration is performed and a CT tunnel is terminated. For example, the application section 202 operates to perform this function using the WLAN interface 212.

At 512, the WLAN access point 310 is disassociated from the device 102. For example, the application section 202 operates to perform this function using the WLAN interface 212.

Exemplary Implementation

Figure 6:
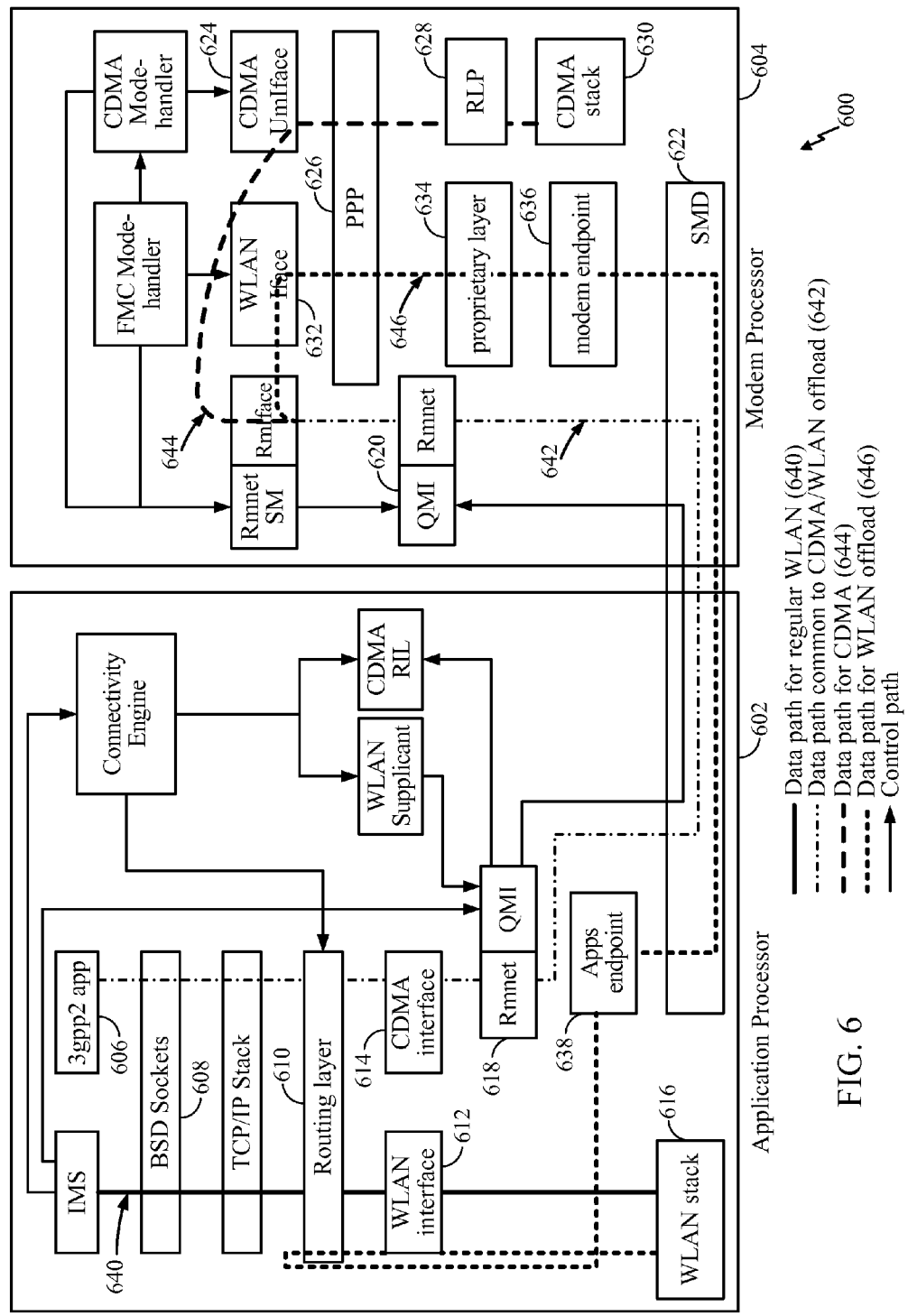
FIG. 6 shows an exemplary implementation of a WLAN offload architecture.

FIG. 6 shows an exemplary embodiment of a novel WLAN offload architecture 600. For example, the architecture 600 is one exemplary implementation of the architecture 200 shown in FIG. 2. The architecture 600 comprises an application processor 602 and a modem processor 604. In this description, any suitable operating system(s) may be run on the application processor 602 and the modem processor 604. An application that needs a service from the cellular (i.e., 3gpp2) core network is represented by the block "3spp2 app" 606. The "3gpp2 app" 606 uses the sockets API provided by the OS to do data transfer with the server in the 3gpp2 core network. The API is represented by the block "BSD Sockets API" 608.

The remaining blocks in the architecture 600 are explained in the following sections, which describe how a packet that is to be sent from the device on the reverse link traverses various layers and modules before being sent over the air. Additionally, a description is provided that describes how a packet that is received by the device on the forward link traverses various layers and modules before reaching the application 606.

Reverse Link Data Path

The detailed steps involved in the transmit path (reverse link) is described as follows. The sockets API used by the 3gpp2 application 606 make use of the underlying IP protocol stack which is also part of the OS on the application processor 602. After the TCP/UDP-IP processing by the OS, the packet looks as shown in FIG. 7.

SIP packets from the IMS stack for discovering the wPDIF-WAG are configured to go over the WLAN air interface. The packet looks as shown in FIG. 8.

There is a routing table at the routing layer block 610 that determines whether IP packets should be directed to the WLAN adaptor (interface) 612 or the CDMA adaptor (interface) 614. From the routing layer, the IMS-SIP packets go to the WLAN stack 616; the MAC and physical layers of WLAN, which is indicated by the path (640) in FIG. 6. Regular data packets from the 3gpp2 application 606 will be directed by the routing table to go over the "CDMA interface/adaptor" 614. Any packets that need to go over one or more CDMA layers needs to cross over to the modem processor 604 and follow the path (642) in FIG. 6.

The module that does the inter-processor data transfer is called QMI/Rmnet. Rmnet is for regular data and QMI (Qualcomm Messaging Interface) for control. There are peer QMI/Rmnet modules (618, 620) running on the application processor 602 and modem processor 604, respectively, and they communicate over a shared memory driver (SMD) 622. The QMI/Rmnet may exist for dual-processor devices but new control messages may be configured as part of these embodiments to indicate that the WLAN offload mode is active.

Once these packets reach the modem processor 604 and come out of Rmnet and the Rm interface, there is a routing decision made on the modem processor 604 as to whether these packets should go on the native cellular air interface or the WLAN offload interface. In both cases, the packets would be HDLC framed and PPP encapsulated and the packets would look as shown in FIG. 9.

If the device is in area of cellular coverage only (no WLAN) or the WLAN offload interface was not setup for some reason (like a failure), the packets would follow the path (644) in FIG. 6. They would be sent to the CDMA interface 624 and after PPP encapsulation at block 626 are sent to the RLP layer (Radio Link Protocol) 628. From RLP 628, the packets are sent over the CDMA protocol stack (MAC/PHY layers of CDMA) 630. The packets are as shown in FIG. 10.

Alternatively, if the device is in WLAN coverage area and the WLAN offload interface was setup, the packets would follow the path (646) in FIG. 6. They would be sent to the WLAN Iface block 632. After PPP encapsulation at block 626, they would be sent to a proprietary layer 634. After the proprietary layer 634 does its processing and adds proprietary headers the packets look as shown in FIG. 11.

The packets are then sent to a module provided as a part of these embodiments called the "modem end-point" 636. The purpose of the "modem end-point" is to open and maintain a communication channel between the modem 604 and the application 602 processors using its counterpart on the application section represented as "apps end-point" 638 using whatever physical medium is used for inter-processor communications between the sections.

In this exemplary embodiment, the shared memory (SMD) 622 is used as the medium. But it could be other mechanisms such as a UART, USB, etc. The apps end-point 638 uses the IP protocol stack provided by the OS on the application processor. This time, the routing layer 610 in the OS examines the outer IP header and knows to send these packets over the WLAN adapter (interface) 612 so that the packets go over the WLAN channel to the wPDIF-WAG. The packets look as shown in FIG. 12.

Forward Link Data Path

The detailed operations involved in the forward link are described as follows. When a packet is received by the device on the CDMA air interface, it is as shown in FIG. 13. An example would be application data if the device is in area of CDMA coverage only (no WLAN) or the WLAN offload interface was not setup for some reason (like a failure).

These packets are received on the modem processor 604, go up the CDMA protocol stack 630, and the CDMA MAC headers are removed. The packets then go through the RLP layer 628 and the RLP header is removed. The packets then reach the PPP layer 626 and the packet look as shown in FIG. 14. Once PPP layer 626 does its processing, the PPP header is removed and the packets are as shown in FIG. 15

The packets then follow the path (644) of FIG. 6. For example, they go through the CDMA data Um interface 624, then onto the Rm interface and Rmnet 620 as they need to be sent across to the application processor 602. The medium shown in this example is shared memory 622, but as discussed above, it can be any other medium as well.

Now the packets follow the path (642) in FIG. 6. The peer Rmnet 618 on the application processor 602 receives the packets and delivers them to the CDMA adapter/interface 614 of the OS. The packets go up the IP stack of the OS, where the TCP/UDP/IP headers are removed and application payload delivered to the user application 606 through the sockets APIs.

When packets arrive on the WLAN air-interface, they can be of two types. The first type of packet is shown in FIG. 16. An example is SIP packets intended for the IMS stack on the device from the SIP server. These packets follow the path (640) shown in FIG. 6. They go up the WLAN protocol, then onto the IP protocol stack where the TCP/UDP/IP headers are removed and the application payload is delivered to the application through the sockets API.

The second type of packet that arrives on the WLAN air-interface is shown in FIG. 17. These are "WLAN offload" tunneled packets that originated in the 3gpp2 core network and are being delivered on the WLAN air-interface. These packets follow the path (646) in FIG. 6. They go up the WLAN protocol, then onto the IP protocol stack where the outer UDP/IP headers are removed and the payload delivered to the apps endpoint 638. At this point, the packets look as shown in FIG. 18.

The apps-end point 638 sends these packets across the SMD 622 over to its peer entity; the modem endpoint 636 on the modem processor 604. The modem end-point 636 sends the packets to the proprietary layer 634 where the proprietary header is removed. Now the packets look as shown in FIG. 14.

The packets go through the PPP layer where they are HDLC de-framed and PPP de-capsulated to look the same as in FIG. 15. The packets now go to the WLAN offload interface 632, which knows that these packets are meant to go on the Rm interface 620. At the Rm interface 620 these packets have to cross the SMD to the applications processor using Rmnet Now the packets follow the path (642) as before, the same as if they were received on the native CDMA interface. The peer Rmnet 638 on the application processor 602 receives the packets and delivers them to the CDMA adapter/interface 614 of the OS. The packets go up the IP stack of the OS, where the TCP/UDP/IP headers are removed and the application payload delivered to the user application 606 through the sockets APIs.

Summary

In various exemplary embodiments, the novel WLAN offload architecture is configured to achieve the above functionality in a smart phone dual-processor architecture having the following constraints and goals.
1. The application section runs a high-level third-party OS which cannot be easily modified.
2. Applications run over the high-level OS.
3. Applications should be unaware of how they are getting service, i.e., whether it is directly over the native CDMA air-interface or over WLAN.
4. The OS on the application section may have a built-in IP protocol stack as well as a WLAN stack.
5. The cellular technologies protocol stack (for example 3gpp2 specific) runs on the modem section.
6. Any layers proprietary to the cellular carrier run on the modem section.
7. Any SIM card (CSIM or RUIM in case of 3gpp2) is attached to the modem section.
8. WLAN offload architecture can be configured for use with different product with just a few minor changes.
9. The same WLAN offload architecture can be applicable with a variety of cellular technologies, such as UMTS or LTE.

Figure 19:
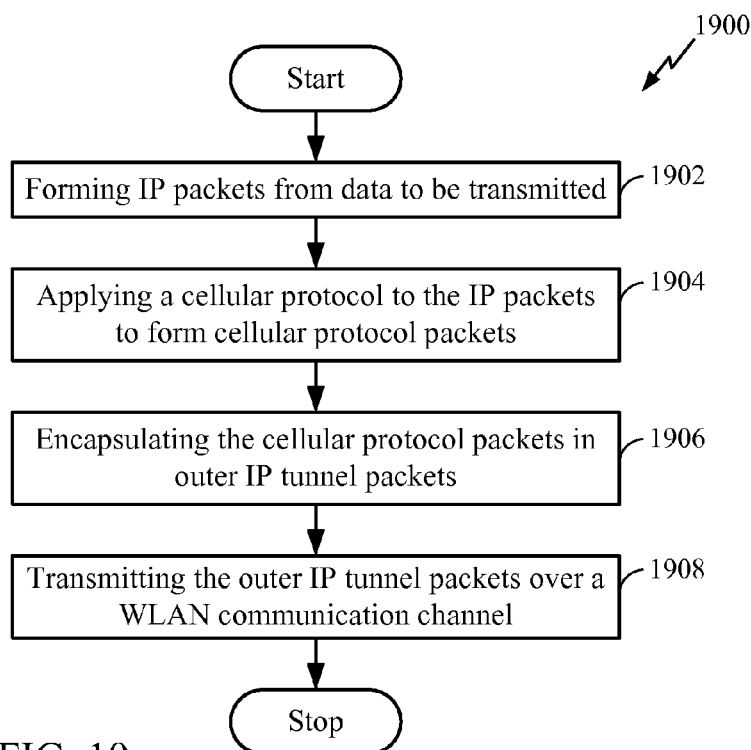
FIG. 19 shows an exemplary method for transmitting data for use in exemplary embodiments of a WLAN offload architecture.

FIG. 19 shows an exemplary embodiment of a method 1900 for transmitted data using an exemplary embodiment of a novel WLAN offload architecture. For example, the method 1900 is suitable for use with the novel WLAN offload architecture 200 shown in FIG. 2. In an exemplary embodiment, the operations described below are performed by the application processor 202 and the modem processor 204 executing one or more instructions stored in a memory.

At block 1902, IP packets are formed from data to be transmitted. For example, the operating system 206 operates to form IP packets from data to be transmitted by the application 230.

At block 1904, a cellular protocol is applied to the IP packets to form cellular protocol packets. For example, the offload module 216 applies a cellular protocol to the IP packets to form cellular protocol packets.

At block 1906, the cellular protocol packets are encapsulated in outer IP tunnel packets. For example, the application endpoint 210 operates to encapsulate the cellular protocol packets into outer IP tunnel packets.

At block 1908, the outer IP tunnel packets are transmitted over a WLAN communication channel. For example, the WLAN I/F 212 operates to transmit the outer IP tunnel packets over the WLAN channel 224.

Thus, the method 1900 operates to transmit data using a novel WLAN offload architecture. It should be noted that the operations of the method 1900 may be rearranged or modified within the scope of the exemplary embodiments described.

Figure 20:
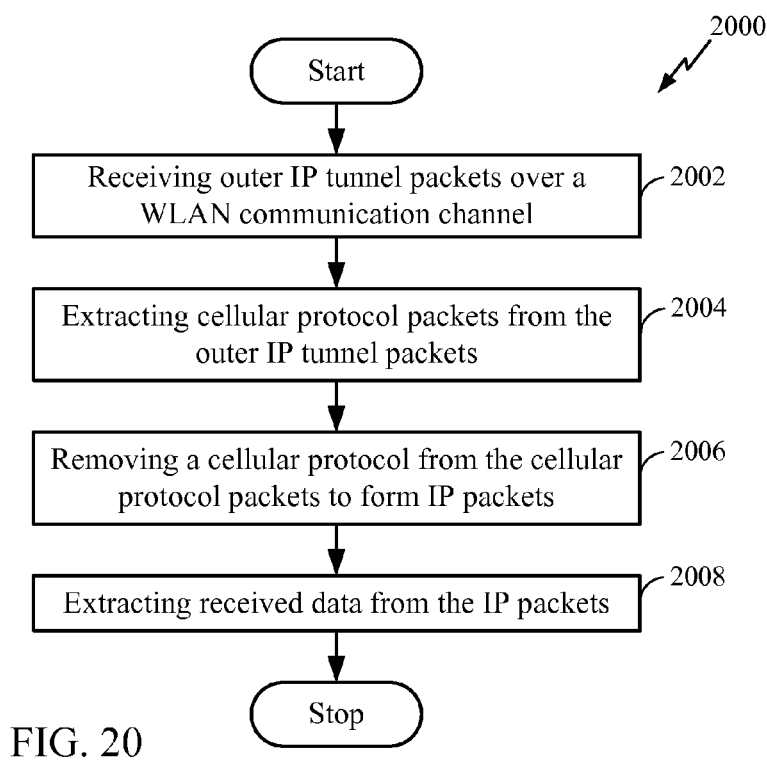
FIG. 20 shows an exemplary method for receiving data for use in exemplary embodiments of a WLAN offload architecture.

FIG. 20 shows an exemplary embodiment of a method 2000 for receiving data using an exemplary embodiment of a novel WLAN offload architecture. For example, the method 2000 is suitable for use with the novel WLAN offload architecture 200 shown in FIG. 2. In an exemplary embodiment, the operations described below are performed by the application processor 202 and the modem processor 204 executing one or more instructions stored in a memory.

At block 2002, the outer IP tunnel packets are received over a WLAN communication channel. For example, the WLAN I/F 212 operates to receive the outer IP tunnel packets over the WLAN channel 224.

At block 2004, the cellular protocol packets are extracted from the outer IP tunnel packets. For example, the application endpoint 210 operates to extract the cellular protocol packets from the outer IP tunnel packets.

At block 2006, a cellular protocol is removed from the cellular protocol packets to form IP packets. For example, the offload module 216 removes a cellular protocol from the cellular protocol packets to form the IP packets.

At block 2008, received data is extracted from the IP packets. For example, the operating system 206 operates to extract received data from the IP packets and provided this data to the application 230.

Thus, the method 2000 operates to receive data using a novel WLAN offload architecture. It should be noted that the operations of the method 2000 may be rearranged or modified within the scope of the exemplary embodiments described.

Figure 21:
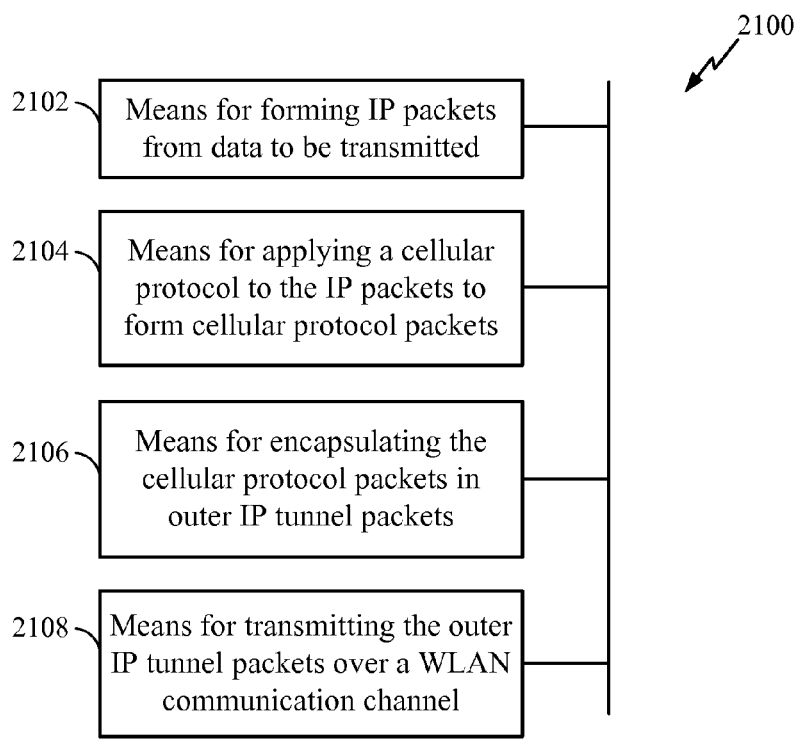
FIG. 21 shows an exemplary apparatus for performing WLAN offload.

FIG. 21 shows an exemplary apparatus for performing WLAN offload. For example, the apparatus 2100 is suitable for use in the device shown in FIG. 2 or FIG. 6. In an aspect, the apparatus 2100 is implemented by at least one integrated circuit comprising one or more modules configured to provide aspects of WLAN offload in a device as described herein. For example, in an aspect, each module comprises hardware and/or hardware executing software.

The apparatus 2100 comprises a first module comprising means (2102) for forming IP packets from data to be transmitted, which in an aspect comprises the OS 206.

The apparatus 2100 also comprises a second module comprising means (2104) for applying a cellular protocol to the IP packets to form cellular protocol packets, which in an aspect comprises OS 214.

The apparatus 2100 also comprises a third module comprising means (2106) for encapsulating the cellular protocol packets to form outer IP tunnel packets, which in an aspect comprises application endpoint 210.

The apparatus 2100 also comprises a fourth module comprising means (2108) for transmitting the outer IP tunnel packets over a WLAN communication channel, which in an aspect comprises WLAN interface 212.

Figure 22:
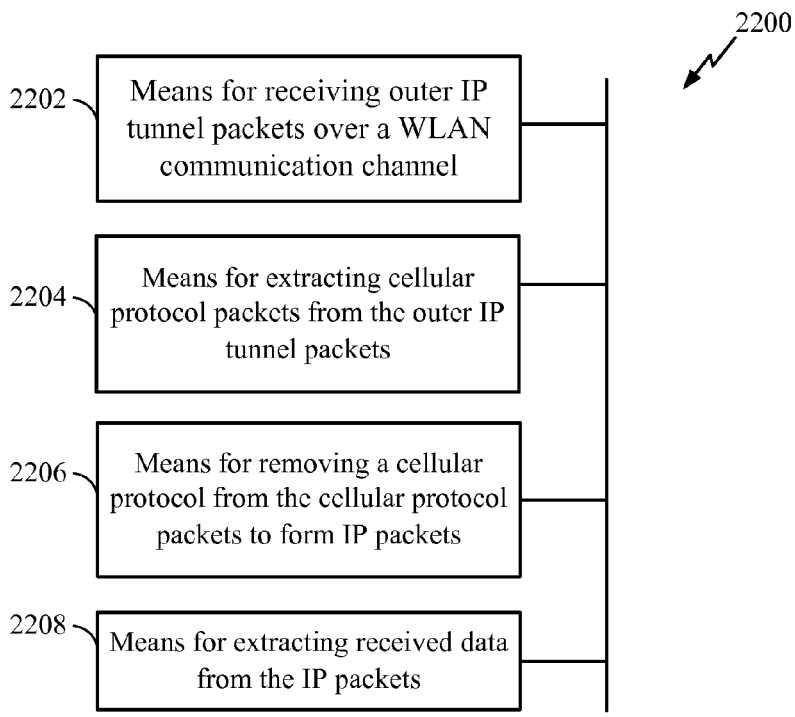
FIG. 22 shows an exemplary apparatus for performing WLAN offload.

FIG. 22 shows an exemplary apparatus for performing WLAN offload. For example, the apparatus 2200 is suitable for use in the device shown in FIG. 2 or FIG. 6. In an aspect, the apparatus 2200 is implemented by at least one integrated circuit comprising one or more modules configured to provide aspects of WLAN offload in a device as described herein. For example, in an aspect, each module comprises hardware and/or hardware executing software.

The apparatus 2200 comprises a first module comprising means (2202) for receiving outer IP tunnel packets over a WLAN communication channel, which in an aspect comprises WLAN interface 212.

The apparatus 2200 also comprises a second module comprising means (2204) for extracting cellular protocol packets from the outer IP tunnel packets, which in an aspect comprises application endpoint 210.

The apparatus 2200 also comprises a third module comprising means (2206) for removing a cellular protocol from the cellular protocol packets to form IP packets, which in an aspect comprises OS 214.

The apparatus 2100 also comprises a fourth module comprising means (2108) for extracting received data from the IP packets, which in an aspect comprises the OS 206.

Although described with reference to a wireless device, it should be noted that the apparatuses and methods described herein are equally applicable to a networked device, base station, cellular home network entity, or any other network entity. Thus, for example, a cellular home network may comprises any of the above described apparatuses and/or perform any of the above described methods to facilitate WLAN offload. For example, data to be transmitted from a cellular home network to a wireless device may be: formed into IP packets; a cellular protocol applied to the IP packets to form cellular protocol packets, the cellular protocol packets encapsulated in outer IP tunnel packets; and the IP tunnel packets transmitted to a wireless device over a WLAN communication channel.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a wireless communication device. In the alternative, the processor and the storage medium may reside as discrete components in a wireless communication device.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of the exemplary embodiments have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. Apparatus for performing wireless local area network (WLAN) offload in a user device having a cellular communication channel and a WLAN communication channel, the apparatus comprising:

an application processor configured to form IP packets from data to be transmitted over the cellular communication channel;

an offload module coupled to the application processor and configured to receive the IP packets to be transmitted over the cellular communication channel and to route the IP packets for transmission over the WLAN channel if it is determined that the WLAN communication channel is available, wherein the IP packets routed for transmission over the WLAN channel are not transmitted over the cellular communication channel, and wherein the offload module applies a cellular protocol to the IP packets that are routed for transmission over the WLAN channel to form cellular protocol packets that are stored in a memory;

an endpoint coupled to receive the cellular protocol packets from the memory and configured to encapsulate the cellular protocol packets to form outer IP tunnel packets to be transmitted over the WLAN communication channel; and a WLAN interface coupled to receive the outer IP tunnel packets and configured to transmit the outer IP tunnel packets from the user device over the WLAN communication channel.

2. The apparatus of claim 1, wherein the memory configured to pass the IP packets from the application processor to the modem processor, and to pass the cellular protocol packets from the modem processor to the endpoint.

3. The apparatus of claim 1, wherein the application processor is configured to execute a selected operating system.

4. The apparatus of claim 3, wherein the data is associated with an application running under the selected operating system.

5. The apparatus of claim 1, wherein the offload module is configured to forward the IP packets for transmission over the cellular communication channel if it is determined that the WLAN channel is not available.

6. The apparatus of claim 5, wherein the offload module determines if the WLAN channel is available by checking a status of all communication channels associated with the user device.

7. The apparatus of claim 6, the offload module configured to:
determine that the IP packets are to be transmitted over the WLAN communication channel if the WLAN communication channel is available; and
determine that the IP packets are to be transmitted over the cellular communication channel if the WLAN communication channel is not available.

8. A method for performing wireless local area network (WLAN) offload in a user device having a cellular communication channel and a WLAN communication channel, the method comprising:
forming IP packets from data to be transmitted over the cellular communication channel;
receiving the IP packets to be transmitted over the cellular communication channel and to route the IP packets for transmission over the WLAN channel if it is determined that the WLAN communication channel is available, wherein the IP packets routed for transmission over the WLAN channel are not transmitted over the cellular communication channel;
applying a cellular protocol to the IP packets that are routed for transmission over the WLAN channel to form cellular protocol packets that are stored in a memory;
retrieving the cellular protocol packets from the memory;
encapsulating the cellular protocol packets to form outer IP tunnel packets to be transmitted over the WLAN communication channel; and
transmitting the outer IP tunnel packets from the device over the WLAN communication channel.

9. The method of claim 8, further comprising:
passing the IP packets through the memory to apply the cellular protocol; and
passing the cellular protocol packets through the memory for encapsulation to form the outer IP tunnel packets.

10. The method of claim 8, further comprising obtaining the data from an application running under a selected operating system.

11. The method of claim 8, further comprising determining that the WLAN communication channel is available to perform the WLAN offload.

12. The method of claim 11, further comprising transmitting the outer IP tunnel packets over the WLAN communication channel to a cellular home network.

13. Apparatus for performing wireless local area network (WLAN) offload in a user device having a cellular communication channel and a WLAN communication channel, the apparatus comprising:
means for forming IP packets from data to be transmitted over the cellular communication channel;
means for receiving the IP packets to be transmitted over the cellular communication channel and to route the IP packets for transmission over the WLAN channel if it is determined that the WLAN communication channel is available, wherein the IP packets routed for transmission over the WLAN channel are not transmitted over the cellular communication channel;
means for applying a cellular protocol to the IP packets that are routed for transmission over the WLAN channel to form cellular protocol packets that are stored in a memory;
means for retrieving the cellular protocol packets from the memory;
means for encapsulating the cellular protocol packets to form outer IP tunnel packets to be transmitted over the WLAN communication channel; and
means for transmitting the outer IP tunnel packets from the device over the WLAN communication channel.

14. The apparatus of claim 13, further comprising:
means for passing the IP packets through the memory to apply the cellular protocol; and
means for passing the cellular protocol packets through the memory for encapsulation to form the outer IP tunnel packets.

15. The apparatus of claim 13, further comprising means for obtaining the data from an application running under a selected operating system.

16. The apparatus of claim 13, further comprising means for determining if the IP packets are to be transmitted over a cellular communication channel or the WLAN communication channel.

17. The apparatus of claim 16, further comprising:
means for determining that the IP packets are to be transmitted over the WLAN communication channel if the WLAN communication channel is available; and
means for determining that the IP packets are to be transmitted over the cellular communication channel if the WLAN communication channel is not available.

18. A computer program product for performing wireless local area network (WLAN) offload in a user device having a cellular communication channel and a WLAN communication channel, the computer program product comprising:
a non-transitory computer readable medium embodying codes executable by a processor to:
form IP packets from data to be transmitted over the cellular communication channel;
receive the IP packets to be transmitted over the cellular communication channel and to route the IP packets for transmission over the WLAN channel if it is determined that the WLAN communication channel is available, wherein the IP packets routed for transmission over the WLAN channel are not transmitted over the cellular communication channel;
apply a cellular protocol to the IP packets that are routed for transmission over the WLAN channel to form cellular protocol packets that are stored in a memory;
retrieve the cellular protocol packets from the memory;
encapsulate the cellular protocol packets to form outer IP tunnel packets to be transmitted over the WLAN communication channel; and
transmit the outer IP tunnel packets from the device over the WLAN communication channel.

19. The computer readable medium of claim 18, further comprising codes configured to cause the processor to:
pass the IP packets through the memory to apply the cellular protocol; and
pass the cellular protocol packets through the memory for encapsulation to form the outer IP tunnel packets.

20. The computer readable medium of claim 18, further comprising codes configured to cause the processor to determine that the WLAN communication channel is available to perform the WLAN offload.

21. The computer readable medium of claim 18, further comprising codes configured to cause the processor to transmit the outer IP tunnel packets over the WLAN communication channel to a cellular home network.

22. Apparatus for performing wireless local area network (WLAN) offload in a user device having a cellular communication channel and a WLAN communication channel, the apparatus comprising:
- a WLAN interface configured to receive outer IP tunnel packets at the device over the WLAN communication channel, wherein the IP tunnel packets include encapsulated cellular protocol packets;
- an endpoint configured to extract the cellular protocol packets from the outer IP tunnel packets, wherein the cellular protocol packets are stored in a memory;
- a modem processor configured to retrieve the cellular protocol packets from the memory and to remove a cellular protocol from the cellular protocol packets to form IP packets and to store the IP packets in the memory; and
- an application processor configured to retrieve the IP packets from the memory and extract received data from the IP packets.

23. The apparatus of claim 22, the memory configured to pass the IP packets from the modem processor to the application processor, and to pass the cellular protocol packets from the endpoint to the modem processor.

24. The apparatus of claim 22, wherein the application processor is configured to execute a selected operating system.

25. The apparatus of claim 24, wherein the data is associated with an application running under the selected operating system.

26. The apparatus of claim 22, wherein the modem processor is configured to communicate the cellular protocol packets over a cellular communication channel.

27. A method for performing wireless local area network (WLAN) offload in a user device having a cellular communication channel and a WLAN communication channel, the method comprising:
- receiving outer IP tunnel packets at the device over the WLAN communication channel, wherein the IP tunnel packets include encapsulated cellular protocol packets;
- extracting the cellular protocol packets from the outer IP tunnel packets, wherein the cellular protocol packets are stored in a memory;
- retrieving the cellular protocol packets from the memory;
- removing a cellular protocol from the cellular protocol packets to form IP packets and storing the IP packets in the memory;
- retrieving the IP packets from the memory; and
- extracting received data from the IP packets.

28. The method of claim 27, further comprising:
- passing the cellular protocol packets through the memory to remove the cellular protocol to form the IP packets; and
- passing the IP packets through the memory to extract the received data.

29. The method of claim 27, further comprising extracting the received data for an application running under a selected operating system.

30. The method of claim 27, further comprising receiving the outer IP tunnel packets over the WLAN communication channel from a cellular home network.

31. Apparatus for performing wireless local area network (WLAN) offload in a user device having a cellular communication channel and a WLAN communication channel, the apparatus comprising:
- means for receiving outer IP tunnel packets at the device over the WLAN communication channel, wherein the IP tunnel packets include encapsulated cellular protocol packets;
- means for extracting the cellular protocol packets from the outer IP tunnel packets, wherein the cellular protocol packets are stored in a memory;
- means for retrieving the cellular protocol packets from the memory;
- means for removing a cellular protocol from the cellular protocol packets to form IP packets;
- means for storing the IP packets in the memory;
- retrieving the IP packets from the memory; and
- means for extracting received data from the IP packets.

32. The apparatus of claim 31, further comprising:
- means for passing the cellular protocol packets through the memory to remove the cellular protocol to form the IP packets; and
- means for passing the IP packets through the memory to extract the received data.

33. The apparatus of claim 31, further comprising means for extracting the received data for an application running under a selected operating system.

34. The apparatus of claim 31, further comprising means for receiving the outer IP tunnel packets over the WLAN communication channel from a cellular home network.

35. A computer program product for performing wireless local area network (WLAN) offload in a user device having a cellular communication channel and a WLAN communication channel, the computer program product comprising:
- a non-transitory computer readable medium embodying codes executable by a processor to:
- receive outer IP tunnel packets at the device over the WLAN communication channel, wherein the IP tunnel packets include encapsulated cellular protocol packets;
- extract the cellular protocol packets from the outer IP tunnel packets, wherein the cellular protocol packets are stored in a memory;
- retrieve the cellular protocol packets from the memory;
- remove a cellular protocol from the cellular protocol packets to form IP packets; and
- extract received data from the IP packets.

36. The computer readable medium of claim 35, further comprising codes configured to cause the processor to:
- pass the cellular protocol packets through the memory to remove the cellular protocol to form the IP packets; and
- pass the IP packets through the memory to extract the received data.

37. The computer readable medium of claim 35, further comprising codes configured to cause the processor to extract the received data for an application running under a selected operating system.

38. The computer readable medium of claim 35, further comprising codes configured to cause the processor to receive the outer IP tunnel packets over the WLAN communication channel from a cellular home network.

* * * * *